April 23, 1963  A. H. SCHELDRUP  3,086,483
RAIL MOUNTED APPARATUS FOR HIGHWAY VEHICLES
Filed April 21, 1960  2 Sheets-Sheet 1
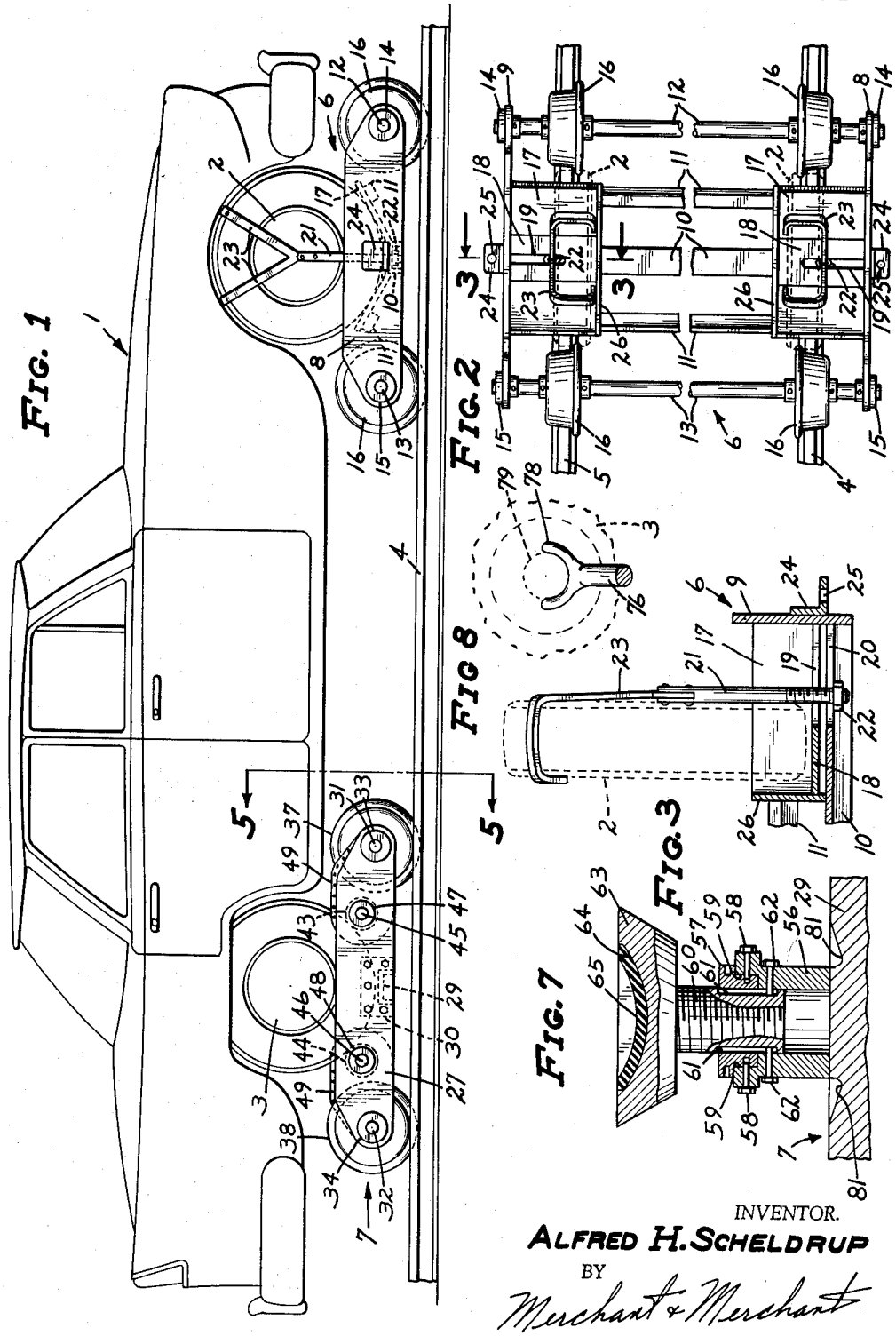
INVENTOR.
ALFRED H. SCHELDRUP
BY
Merchant & Merchant
ATTORNEYS April 23, 1963
A. H. SCHELDRUP
3,086,483
RAIL MOUNTED APPARATUS FOR HIGHWAY VEHICLES
Filed April 21, 1960
2 Sheets-Sheet 2
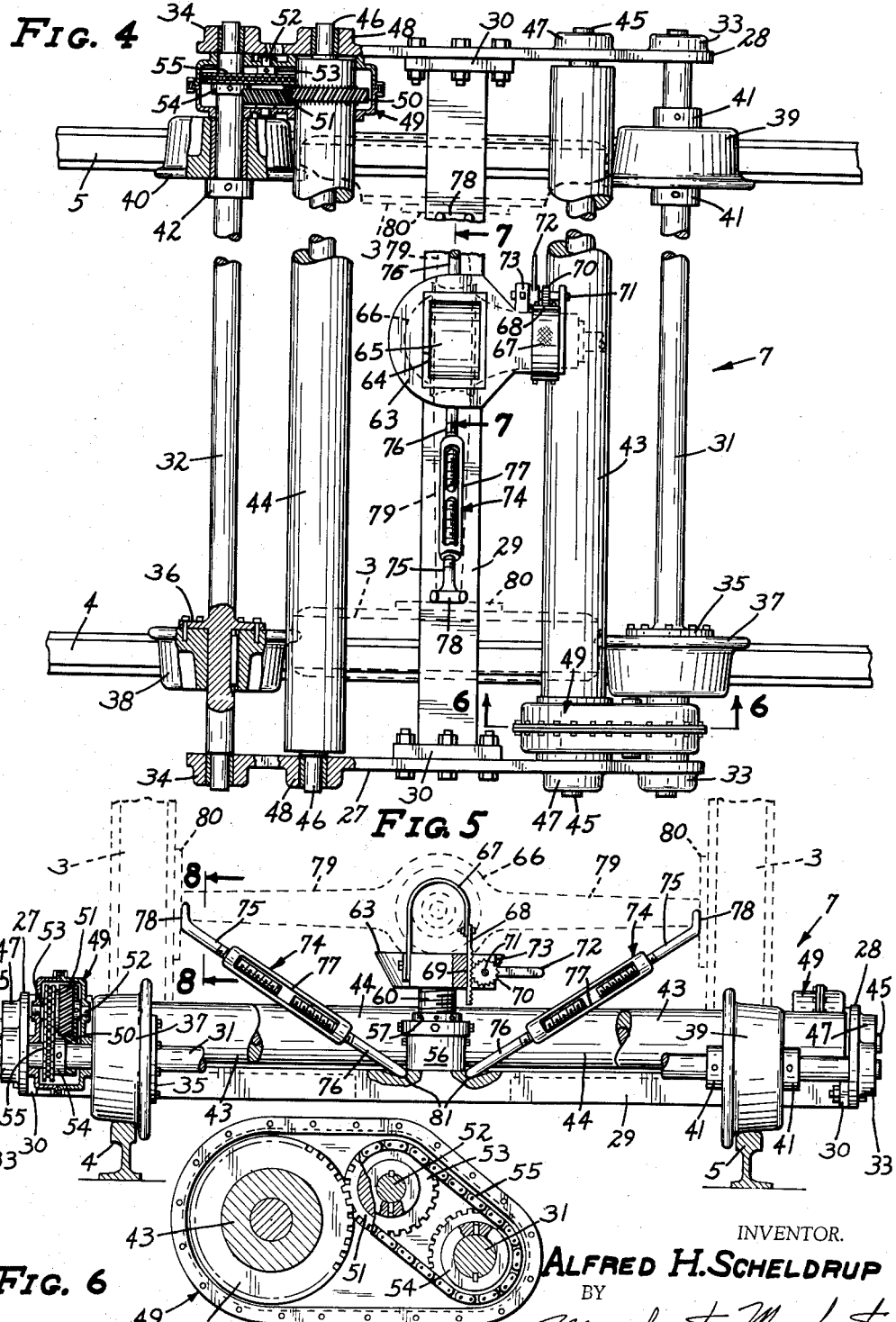
INVENTOR.
ALFRED H. SCHELDRUP
BY
Merchant & Merchant
ATTORNEYS

United States Patent Office 3,086,483
Patented Apr. 23, 1963

3,086,483
RAIL MOUNTED APPARATUS FOR
HIGHWAY VEHICLES
Alfred H. Scheldrup, Box 4493, Carmel, Calif.,
Filed Apr. 21, 1960, Ser. No. 23,759
3 Claims. (Cl. 105—159)

My invention relates generally to apparatus for adapting a highway vehicle for self-powered operation on railroad rails, and more particularly to improvements in apparatus of this general type.

An important object of my invention is the provision of a vehicle supporting truck which can be quickly and easily attached to a highway vehicle in supporting relationship to the drive wheels of said vehicle to adapt the same to travel on railroad rails without requiring modification of said vehicle.

Another object of my invention is the provision of apparatus as set forth which may be used with vehicles having various wheel base and wheel track dimensions.

Another object of my invention is the provision of such apparatus which, when applied to a highway vehicle, will support said vehicle at a substantially low level above the rails.

Another object of my invention is the provision of a truck having power transmission mechanism adapted to be driven by the drive wheels of the vehicle, and novel connections to the rail supported wheels thereof, whereby the truck wheels engaging one rail of a spaced pair thereof are permitted to rotate at different speeds than the wheels engaging the other rail.

Still another object of my invention is the provision of adjustable means on said truck for supporting a portion of the weight of the vehicle thereon, whereby some of the vehicle weight is removed from the vehicle tires.

A still further object of my invention is the provision of novel means for releasably anchoring the vehicle against movements relative to the truck.

Another object of my invention is the provision of vehicle supporting apparatus as set forth, which is relatively simple and inexpensive to produce, which is efficient in operation, and which is rugged in construction and durable in use.

The above, and still further highly important objects and advantages of my invention will become apparent from the following detailed specification, appended claims, and attached drawings.

Referring to the drawings, which illustrate the invention, and in which like reference characters indicate like parts throughout the several views:

FIG. 1 is a view in side elevation of a highway vehicle mounted for rail travel on a pair of trucks or carriages made in accordance with my invention;

FIG. 2 is a view in top plan of the truck or carriage underlying the front end portion of the vehicle of FIG. 1, some parts being broken away;

FIG. 3 is an enlarged fragmentary section taken substantially on the line 3—3 of FIG. 2, and angularly rotated with respect to FIG. 2, whereby to be shown in its normal position;

FIG. 4 is an enlarged view in top plan of the truck or carriage of my invention underlying the rear or driving wheels of the vehicle, some parts being broken away and some parts being shown in section;

FIG. 5 is an enlarged view in front elevation of the truck of FIG. 4 as seen from the line 5—5 of FIG. 1, some parts being broken away and some parts being shown in section;

FIG. 6 is a further enlarged fragmentary detail in section, taken on the line 6—6 of FIG. 4;

FIG. 7 is an enlarged fragmentary section taken on the line 7—7 of FIG. 4; and

FIG. 8 is an enlarged fragmentary detail in section, taken on the line 8—8 of FIG. 5.

Referring with greater detail to the drawings, the numeral 1 indicates generally a conventional highway vehicle in the nature of a passenger motor car having pneumatic tire equipped front wheels 2 and pneumatic tire equipped rear drive wheels 3. To adapt the vehicle 1 for travel on railroad rails, indicated at 4 and 5, the vehicle 1 is mounted on a pair of trucks or carriages 6 and 7, the former thereof underlying the front wheels 2 and the latter thereof underlying the rear drive wheels 3.

The front truck or carriage 6 comprises a pair of laterally spaced parallel side frame members 8 and 9 that are vertically disposed and elongated in the direction of travel of the truck 6, a transverse frame member 10 welded or otherwise rigidly secured at its opposite ends to the intermediate portions of the side frame members 8 and 9, and a pair of cross brace members 11 anchored at their opposite ends to the side frame members 8 and 9, and disposed in spaced parallel relationship to the transverse member 10. Front and rear axles 12 and 13 respectively are journalled at their opposite ends in respective bearings 14 and 15 at the front and rear ends respectively of the side frame members 8 and 9, said axles 12 and 13 carrying flanged railroad rail engaging wheels 16. The truck 6 further includes a pair of upwardly opening troughs or cradles 17 for reception of the front or non-driving wheels 2 of the vehicle 1, said troughs extending laterally inwardly from adjacent ones of the side frame members 8 and 9. With reference to FIG. 1, it will be seen that the troughs or cradles 17 are generally V-shaped whereby to receive wheels of various diameters, the cradles 17 extending laterally inwardly from their respective side frame members 9 a distance sufficient to enable the cradles to receive wheels of various axial spacing or track.

With reference particularly to FIGS. 2 and 3, it will be seen that the bottoms 18 of the troughs 17, as well as the transverse frame member 10, are provided with elongated slots 19 and 20 respectively for the reception of elongated vertically disposed studs 21 having adjustment nuts 22 screw threaded on their lower ends. Riveted or otherwise rigidly secured to the upper ends of the studs 21 are bifurcated hooks or the like 23 that are adapted to be placed over the upper circumferential portions of the tires of the front wheels 2 whereby to releasably lock the wheels 2 against movement in their respective cradles 17. For the purpose of accommodating vehicles having wider than normal wheel track dimensions, I provide a pair of angle members 24 that are welded or otherwise rigidly secured to the outer surfaces of the side frame members 8 and 9 and which are provided with apertures 25 for selective reception of the front wheel anchoring studs 21. With reference particularly to FIGS. 1 and 3, it will be seen that the intermediate portions of the side frame members 8 and 9 extend upwardly above the level of the bottom portions of the tires of the front wheels 2, whereby to limit laterally displacement of the vehicle 1 with respect to the truck 6, in the event that the nuts 22 become loosened on the studs 21. Further, the troughs 17 are provided with inner end walls 26 which also limit lateral movement of the vehicle 1 with respect to the truck 6.

The truck 7 is generally similar to the truck 6, in that the truck 7 comprises a pair of elongated side frame members 27 and 28 and a cross frame member 29. The side frame members 27 and 28 are vertically disposed and elongated in the direction of travel of the truck on the rails 4 and 5, the cross frame member 29 being formed at its opposite ends to provide mounting flanges 30 that are bolted or otherwise rigidly but detachably secured to the plate-like side frame members 27 and 28. Parallel front and rear axles 31 and 32 respectively extend transversely of the truck 7 and are journalled in respective bearing bosses 33 and 34 at the front and rear ends respectively of the frame members 27 and 28. The axles 31 and 32 are formed to provide radial flanges 35 and 36 respectively, to which are bolted or otherwise releasably locked railroad rail engaging flanged wheels 37 and 38 respectively. With reference to FIG. 4, it will be seen that the wheels 37 and 38 are adapted to roll on the rail 4. Other railroad rail engaging wheels 39 and 40, adapted to roll on the railroad rail 5, are journalled for independent rotation on their respective axles 31 and 32, the wheel 39 being held against axial movement on the axle 31 by stop collars or the like 41 pinned or otherwise rigidly secured to the axle 31. A similar stop collar 42 limits axial movement of the wheel 40 on the axle 32 in one direction.

A pair of elongated front and rear drive rollers 43 and 44 respectively, are provided at their opposite ends with diametrically reduced shaft portions 45 and 46 respectively, that are journalled in respective bearing bosses 47 and 48 in the side frame members 27 and 28. The front drive roller 43 is disposed in generally rearwardly spaced parallel relation to the front axle 31, the rear drive roller 44 being disposed in generally forwardly spaced parallel relationship to the rear axle 32. As shown in FIGS. 1 and 5, the drive rollers 43 and 44 are disposed above the level of the transverse frame member 29, and are spaced apart in a manner to cradle the rear drive wheels 3 of the vehicle 1 therebetween in upwardly spaced relation to the transverse frame member 29. The drive rollers 43 and 44 are operatively coupled to their adjacent axles 31 and 32 respectively by identical power transmission mechanisms, each of which is contained in a different one of a pair of housings 49, and each of which comprises, a drive gear 50 rigidly secured to its respective drive roller 43 and 44 for common rotation therewith. A driven gear 51 rigidly secured to an idler shaft 52 suitably journalled in its respective housing 49, a drive sprocket 53 also rigidly secured to the idler shaft 52, a driven sprocket wheel 54 rigidly secured to a respective one of the axles 31 and 32, and an endless drive chain 55 entrained over the sprocket wheels 53 and 54. With reference to FIG. 4, it will be seen that the front transmission housing 49 is located adjacent the side frame member 27, the rear transmission housing 49 being disposed adjacent the side frame member 28, a portion of the rear transmission housing 49 being disposed adjacent the rail engaging wheel 40 and limiting axial movement thereof in a direction toward the side frame member 28. It will be noted that the housings 49 completely enclose the transmission mechanisms to protect the same from dust, grit, and the like.

Inasmuch as the drive rollers 43 and 44 are of somewhat small diameter, the weight of that portion of the vehicle 1 that is applied to the pneumatic tires of the driving wheels 3 would normally cause the drive roller engaging portions of the tires to tend to conform to the outline of the rollers 43 and 44. Then, as the wheels 3 are caused to rotate, the tires thereof are subject to extreme flexing beyond that which normally occurs during highway travel, resulting in rapid wear and early tire failure. To remedy this condition, I provide adjustable supporting means for the drive wheel end portion of the vehicle 1, now to be described. A tubular pedestal 56 is welded or otherwise rigidly secured to the central portion of the transverse frame member 29, and extends upwardly therefrom. At its upper end, the pedestal 56 is counterbored to receive a tubular nut element 57 that is journalled therein and which is held against axial movement relative to the pedestal 56 by circumferentially spaced key bolts or the like 58 that extend radially inwardly through the upper end portion of the pedestal 56, the inner ends of the key bolts 58 being received in a radially outwardly opening circumferential channel 59 in the tubular nut 57. A screw threaded leg 60 is threadedly received in the tubular nut 57 and is provided with circumferentially spaced axially extending keyways 61 in which are received the inner ends of key bolts 62 that extend radially inwardly through the tubular pedestal 56 below the tubular nut 57, see particularly FIG. 7. The key bolts 62 guide the leg 60 for axial upward and downward movements relative to the tubular pedestal 56, but hold the leg 60 against rotation with respect to the pedestal 56. At its upper end, the leg 60 is formed to provide an enlarged head 63, the top surface of which defines an upwardly opening recess 64 that is preferably lined with cushioning material, such as rubber or the like, indicated at 65. The recess 64 is adapted to nestingly receive the bottom portion of the conventional differential housing usually associated with the drive wheels of the vehicle, the housing being shown by dotted lines in FIGS. 4 and 5, and indicated by the numeral 66. The tubular nut 57 is adapted to be turned with the use of a pin wrench or spanner wrench, not shown, and turning thereof in either direction will raise or lower the drive wheels 3 relative to the drive rollers 43 and 44. Thus, the pedestal 56 and leg 60 is adapted to support as much of the weight of the rear end portion of vehicle 1 as is necessary to prevent undue flexing of the tires of the drive wheels 3 on the drive rollers 43 and 44. Obviously, there should be a sufficient weight applied to the tires of the drive wheels 3 so that proper traction is maintained therebetween and the drive rollers 43 and 44.

For releasably locking the vehicle 1 against movements relative to the truck 7, when the drive wheels 3 are set in motion, I provide releasable locking means including a flexible strap-like element 67 that is anchored at one end to the head 63 and which is adapted to be looped over a portion of the vehicle differential housing 66 forwardly of the recess 64, see particularly FIGS. 4 and 5. The opposite end of the element 67 has secured thereto a toothed bar or rack 68 that is adapted to slidably engage a side portion 69 of the head 63 and to be operatively engaged by a pinion 70 that is mounted on a shaft 71 journalled to the head 63. An operating handle 72 is utilized to turn the pinion shaft 71 in either direction through the medium of a conventional reversing ratchet mechanism indicated diagrammatically at 73, see FIG. 4.

For further anchoring the drive or rear end portion of the vehicle 1 against lateral shifting on the truck 7, I provide a pair of identical braces 74, each comprising a pair of screw thread equipped sections 75 and 76 and a cooperating turnbuckle member 77, see particularly FIG. 5. The free end of each of the sections 75 is bifurcated, as indicated at 78 in FIG. 8, said bifurcated ends 78 being adapted to partially embrace the drive axle shaft housing 79 of the vehicle 1 and lie against the adjacent brake mounting flange 80 of an adjacent drive wheel 3. The transverse frame member 29, adjacent the base of the pedestal 56, is formed to provide a pair of diametrically opposed recesses 81 for reception of the free ends of the brace sections 76. Adjustment of the turnbuckle members 77 permits the braces 74 to be properly installed when the vehicle 1 is placed on the trucks 6 and 7, and to be easily removed when it is desired to remove vehicle 1 from the trucks, for highway use. Longitudinal adjustment of the braces 74 further adapts the same for use with vehicles of different wheel track dimensions, as well as various wheel diameters.

From the above, it will be seen that I have provided means for quickly and easily adapting a conventional highway vehicle for use on railroad rails without the necessity of altering the vehicle or of permanently attaching special fixtures thereto. The vehicle may be raised or lowered by any suitable means, not shown, to enable the trucks 6 and 7 to be placed thereunder. The above described arrangement whereby the front and rear axles of both trucks 6 and 7 are spread apart a material distance, and wherein the drive rollers 43 and 44 are located between the front and rear axles 31 and 32 of the truck 7, enables the vehicle 1 to be supported at a substantially low level above the rails 4 and 5. Further, with the drive rollers 43 and 44 operatively coupled for driving engagement with the flanged wheels 37 and 38 on only one of the railroad rails, namely the rail 4, smooth operation of the driving truck 7 on curved portions of the rails 4 and 5, is assured, without the necessity of special differential mechanisms between the wheels of a given one of the axles 31 and 32.

While I have shown and described a single embodiment of my improved means for supporting highway vehicles on railroad rails, it will be understood that the same is capable of modification without departure from the spirit and scope of the invention, as defined in the claims.

What I claim is:

1. The improvement in an apparatus for supporting highway vehicles having pneumatic tire equipped drive wheels on railroad rails, said improvement comprising a truck adapted to underlie the drive wheels at one end portion of a highway vehicle and including, a truck frame having laterally spaced parallel longitudinal outer side frame members and a rigid transverse connecting inner frame member, parallel front and rear truck axles extending transversely of said frame and journalled adjacent their ends in said outer side frame members, front and rear pairs of railroad rail engaging flanged wheels on said front and rear axles between said outer side frame members, one of the wheels of each of said pairs of wheels being mounted fast on its respective axle for common rotation therewith, the other wheels of said pairs thereof being journalled on their respective axles for independent rotation, a pair of vehicle drive wheels engaging and supporting rollers journalled at their opposite ends in said outer side frame members on spaced axes in spaced parallel relation to said front and rear axles, said rollers having tire engaging peripheral surfaces extending for the greater part of the length of said rollers whereby to accommodate drive wheels of vehicles of various wheel track dimensions, independent power transmission mechanisms operatively coupling each of said rollers to a wheel associated with a different one of said axles, a pedestal extending upwardly from the intermediate portion of said transverse connecting frame member and having a vertically adjustable head at its upper end, said head defining an upwardly opening recess for supporting engagement with a bottom portion of the differential housing of the vehicle, and a clamping member for releasably locking said differential housing against vertical movement out of said recess, whereby vertical adjustment of said head will prevent undue flexing and wear on the vehicle tires while permitting pivotal lateral sway of the body supported weight on said pedestal relative to said truck.

2. The structure defined in claim 1 in which said clamping member comprises an elongated band having a flexible portion adapted to be looped over a portion of the differential housing, and a tightening device on said adjustable part of the pedestal and operatively engaging said band to hold the differential housing in said recess.

3. The structure defined in claim 1 in further combination with a pair of longitudinally extensible and contractable brace members, said transverse frame member defining a pair of recesses for reception of the inner ends of said brace members, each of said brace members extending angularly upwardly and laterally outwardly from one of said recesses and having bifurcated outer ends adapted to engage drive axle housing portions of said vehicle adjacent the drive wheels thereof to anchor said vehicle against movements transversely of said frame.

References Cited in the file of this patent
UNITED STATES PATENTS 1,880,126    Fageol _____ Sept. 27, 1932
2,171,093    Klima et al. _____ Aug. 29, 1939

FOREIGN PATENTS 737,982    Germany _____ July 30, 1943